(12) United States Patent
Tsao

(10) Patent No.: US 9,288,266 B1
(45) Date of Patent: *Mar. 15, 2016

(54) METHOD AND APPARATUS FOR WEB BASED STORAGE ON-DEMAND

(71) Applicant: Sheng Tai Tsao, Fremont, CA (US)

(72) Inventor: Sheng Tai Tsao, Fremont, CA (US)

(73) Assignee: Sheng Tai (Ted) Tsao, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/511,129

(22) Filed: Oct. 9, 2014

(51) Int. Cl.
*G06F 15/16* (2006.01)
*H04L 29/08* (2006.01)
*H04L 12/24* (2006.01)

(52) U.S. Cl.
CPC ............ *H04L 67/1097* (2013.01); *H04L 41/12* (2013.01); *H04L 67/16* (2013.01)

(58) Field of Classification Search
CPC ...................................................... H04L 41/12
USPC .......................................... 709/203, 220, 223
See application file for complete search history.

*Primary Examiner* — Adnan Mirza

(57) ABSTRACT

A distributed virtual SAN infrastructure provides a scalable dynamically expandable virtual storage service pool to a plurality of host systems. The storage service pool is created via execution of a virtual storage automatic construct protocol and provides storage volume (space) to each of the host systems in on-demand base. The distributed virtual SAN infrastructure includes one or more SAN units including IP SAN unit and Fiber Channel SAN unit, at least one management console, one distributing control system across a network infrastructure, where the network infrastructure provides the communication links between all systems in the distributed virtual SAN infrastructure.

20 Claims, 10 Drawing Sheets

Distributed Virtual SAN Infrastructure

The UDP packet format used by "Virtual SAN Auto Configuration Protocol"

Example of Storage Volume Information of an IP SAN Unit

Note: Each volume may further be partitioned into small chunk of partition.

A Hypothetical Example of Storage Volume Requests and Assignments

Direct Attached Storage System:

In-Band Accessed Virtual SAN

Central Controlled Distributed Scalable Virtual Machine Infrastructure

The typical hardware components of a computer system such as for a control management system, system units including storage units, host, and console host:

A Layered CCDSVM structure

METHOD AND APPARATUS FOR WEB BASED STORAGE ON-DEMAND

CROSS-REFERENCE TO RELATED APPLICATION(S)

The present application is a continuation application for the U.S. patent application Ser. No. 13/916,445 filed on Jun. 12, 2013 which in turn is a continuation application of U.S. patent application Ser. No. 12/944,958 filed on Nov. 12, 2010 and now a U.S. Pat. No. 8,473,596, which in turn is a divisional patent application for U.S. patent application Ser. No. 12/013,813 filed on Jan. 14, 2008 and now a U.S. Pat. No. 8,639,788, which in turn itself is a divisional application of U.S. patent application Ser. No. 10/713,905 filed on Aug. 12, 2002, converted from U.S. provisional application of 60/402,626 and now is a U.S. Pat. No. 7,378,990. The application Ser. No. 12/944,958 also is a continuation-in-part (CIP) of US parent application Ser. No. 12/079,482 filed on Mar. 27, 2008 and now a U.S. Pat. No. 8,566,463, which itself is a divisional application of U.S. patent application Ser. No. 10/713,904 filed on Aug. 6, 2002, converted from a US provisional application of 60/401,238 and now is a U.S. Pat. No. 7,418,702). All above mentioned applications are incorporated by reference herein in their entirety for all purpose.

FIELD OF THE INVENTION

The present invention generally relates to computer communications network. More specifically, the present invention relates to web based data storage systems.

BACKGROUND OF THE INVENTION

Today's corporate IT professionals typically face many challenges to handle the ever increasing information and data. To handle large amount of data, many organizations expand their storage capacity by employing storage systems locally in order to maintaining their normal business operating. A conventional approach is to use IP based network attached storage ("NAS"), which effectively provides data storage and services for end users. Moreover, at the enterprise level, the majority storage systems are directly attached or connected to server(s) or host(s) as shown in FIG. 7. These server(s) and/or host(s) are typically access to storage devices through conventional communication connection media, such as traditional IDE, SCSI, or Fiber Channel.

The server, which is directly attached to a storage system as illustrated in FIG. 7 typically has many drawbacks, which are described as following:

a typical conventional storage management system is only capable of handling 4 TB (terabytes) of data, which is usually not good enough for an enterprise storage system;

The most of servers, which are directly attached to storage systems, have problems for further expanding their storage capacity. For example, it may require to purchase new servers or require shutdown the server in order to increase storage capacity;

The storage being attached to a server can only be accessed by the attached server and can not be shared by other servers because the server's spare storage capacity can not be distributed across all servers within a organization;

Each attached storage system has to be managed separately and this is a nightmare for IT professionals;

With the attached storage system, the backup/restore has to go through the data network, this will tax or reduce the network performance;

A typical SCSI connection only allows a 12-meter distance for data accessing with 15 storage devices. Similarly, Fibre Channel is limited to 10 kilometers communication distance. Distance limitation effectively prevents them from being the best choice for disaster recovery of the storage system; and The Fiber Channel based storage system cannot handle well for the interoperability. Also, the Fibre Channel based storage system is expensive to build and to maintain.

FIG. 8 shows a conventional type of the virtual SAN, which is in-band controlled and accessed with which the data path from hosts (1 of FIG. 8) to the SAN units (4 of FIG. 8) going through control management station (2 of FIG. 8). It is not efficient in term of accessing the data by the hosts because the virtual SAN control management station can easily be a performance bottleneck. Similarly, the scalability of this type of the virtual SAN is poor.

SUMMARY

With rapid development of high speed communication technology, the problems mentioned above can be solved by an IP based out-band accessed distributed virtual SAN infrastructure illustrated in FIG. 1 of present invention. In one embodiment by referencing to the FIG. 1, each host1 can directly access to IP based SAN units 4 without going through the control management station ("control system") 3. The IP based out-band accessed distributed virtual SAN actually represents an example of a central controlled distributed scalable virtual machine system (CCDSVM illustrated in FIG. 9. Wherein, each system units actually is a SAN unit 4, specifically is an IP based SAN unit.

In one embodiment, each SAN unit 4 of the distributed virtual SAN can be access by one or more hosts 1 and each host can access one or more SAN units 4 as illustrated in FIG. 6. Therefore, every storage volume can be fully utilized without wasting a bit of capacity. In addition, as illustrated in FIG. 1, the storage access goes directly through data communication link of a network infrastructure 2 between the hosts1 and SAN units 4 without involvement of the control system 3. Further, a new SAN unit 4 of the virtual SAN can be dynamically added or removed at any time without interrupting current access of SAN units 4 by said hosts1. In addition, all SAN units are centrally controlled, monitored, and managed by a control system 3 through a management console 10 of a console system14. The control system 3 may also accept storage volume/partition requests from each host 1, and assign the matched volumes/partitions of the SAN units 4 to these requested hosts 1. Therefore, each host 1 could directly and efficiently access the right volumes/partitions of assigned SAN units4 without interfering each other and without going through the control system again. In addition, the backup and restore will not go through data network, therefore, it will enhance the performance and flexibility for the backup/restore operations.

This invention will become understood with reference to the following description, claims, and accompanying figures.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

The following terms are used through out this patent application to describe the present invention. A central controlled distributed scalable virtual machine ("CCDSVM") system in one embodiment allows a control management system to control a group of computing systems and to provide distributed services to client systems over an Intranet, the Internet, and/or LAN environment. Storage media includes magnetic hard disk drives, solid state disk, optical storage drive, and memory card etc. Storage connection and control media may include controller of IDE, SCSI, Fibre optical, Ethernet, USB, or wireless media, and/or other related cables etc. Each controller of the storage media such as Raid, IDE, or SCSI controller may control multiple storage devices on a computing system. Storage system includes one or more storage devices, storage connections, and/or storage media controllers. Storage system also contains related software modules for delivering storage services. A storage volume or partition is a unit of usable storage space having an unique storage address with a fixed length being configured in a storage device.

Storage area network ("SAN") is a storage system that is capable of providing block data services to various computer devices through storage connection and control media, such as Fiber-optical, Ethernet or other said media by deploying Internet Protocol ("IP") or non-IP based protocols. The non-IP based connection and control media, in one example, includes Fibre-Channel. IP SAN unit uses IP based protocol to provide storage raw block data services. All discussions of the SAN in this invention are within the scope of a central controlled distributed scalable virtual machine ("CCDSVM").

DNS stands for domain name service, which is an Internet software infrastructure and is capable of identifying and resolving network addresses and name for computing systems across a network. A Simple Network Management Protocol ("SNMP") is a standard Internet protocol. A SNMP trap is a user datagram protocol ("UDP") packet, which may be used to send a SNMP message (a event) from a SNMP agent system to a SNMP network management station across a network.

Figure 1:
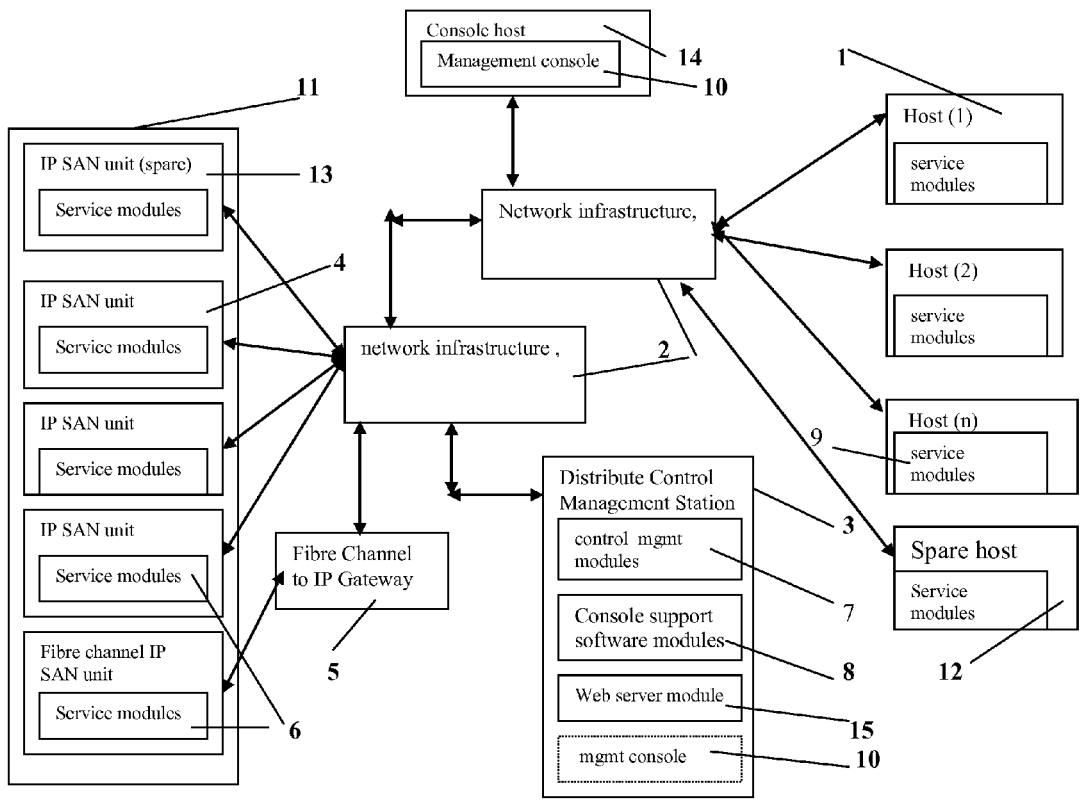
FIG. 1 illustrates a distributed virtual storage area of network ("SAN") infrastructure in accordance with one embodiment of the present invention.

FIG. 1 shows an example of a simplified block diagram of IP based out-band accessed distributed virtual SAN infrastructure. The distributed virtual SAN infrastructure includes a plurality of hosts 1, network infrastructures 2, a control management system 3, a virtual storage pool 11 of a plurality of SAN units 4, including IP SAN unit 4, spared SAN unit 13 and fiber channel SAN units 4 which connected via fiber-channel-to-IP gateway, and a management console 10 in a console host 14. In one embodiment, each host 1 contains service software modules 9. The service software modules 9 are configured to communicate with control management software modules 7 of the control management system 3 for obtaining information of the virtual SAN, for one example to get the storage information on a specific SAN unit 4. The service software modules 9 of the host 1 also is capable to communicate with service software modules 6 of a SAN unit 4 for read block data therefrom or write block data thereto. The service software modules 9 can be coded and implemented with any suitable programming languages such as C, C++, Java or others. The service software modules 9 may also use any suitable protocols such as IP based or non-IP based protocols.

The host1, in one embodiment, could be a server, a desktop, a laptop PC, or a personal communication device such as a PDA or a cell phone etc., which is configured access to block data storage device. In another embodiment, the host 1 is capable of creating at least one local file system by utilizing at least one storage volume on a SAN unit 4 in addition to utilizing storage volume on its local storage device. In one more embodiment, the host1 may creating at least one local database by utilizing at least one storage volume on one of SAN units 4 in addition to utilize its own local storage devices. In addition, at least a spare host 12 can be deployed in the virtual SAN infrastructure, wherein the spare host 12 represents a part of recovery scheme that could be implemented for providing service replacement for a failed host 4 in the CCDSVM environment, and each spare host 12 can serve multiple hosts.

Network infrastructure 2 can comprise various types of communication links. The network infrastructure 2 could be one of a corporate storage network, a local area network ("LAN"), a corporate intranet, the Internet, a wide area network ("WAN") or other network without limits. In one embodiment, network infrastructure 2 includes switches, routers, gateways, cables (Ethernet, optical Fibre), wireless communication media, or others without limits. The network infrastructure 2 provides data path between the hosts 1, the distribute control management system 3, and the SAN Units 4. The network infrastructure 2 also includes software infrastructure such as DNS or DHCP for facilitating each of computing systems on the network to identifying a target computing system's addresses for ease of sending or receiving data within a network domain or in a cross-domain network environment.

It should be noted that DNS and/or other Internet address identification mechanism may be used when a message or other data is sent from a system A to a system B via a communication link of the network infrastructure 2.

The control management system 3 includes distributing control management software modules 7 and console support software modules 8. To support web-based console, it requires web server software modules 15. The distribute control management software modules 7, in one embodiment, communicate with the service modules 6 of each of IP SAN units 4 to retrieve storage information for constructing a virtual SAN storage pool 11. The communication between the distributed control management software modules 7 and the service modules 6 of each of the IP SAN units 4 is further configured to monitor the each of the IP SAN units 4, or perform various system operations thereto, which include storage configuration and partitioning etc. The control management software modules 7 also communicate with service software modules 9 of each of the hosts 1 for distributing storage volumes to the each of the hosts 1. The distribute control management software modules 7 can be implemented with any suitable programming languages such as C, C++, Java, XML, etc. The communication protocols between the control management system 3 and each of the IP SAN units 4 could be any suitable IP based protocols. The communication between the control management system 3 and the hosts 1 can be any suitable IP base or non-IP based protocols.

The console support software modules 8 employ inter-process communication mechanism to obtain information relating to the IP SAN units 4 and the hosts 1 from the distributed control management software modules 7. The console support software modules 8 actually also plays a role for web interface which operatively coupled to web server software modules 15 through the inter-process communication mechanism for providing web services and web user interfaces ("UI") that include sending information of the SAN units 4 and the hosts 1 to a console system 14 for displaying the information via the management console 10.

The web server software 15 communicates with the management console software 10 on the console host 14 through web protocol such as HTTP for displaying the information of the virtual SAN infrastructure into the management console 10 (web browser) on the console host 1. The web server software 15 could be commercially available software on the market such as Apache or IIS or other proprietary software.

To simplify foregoing discussion, the communication path mentioned above will be simply referred to as the console support software modules 8, which communicate (send/receive data) with the management console 10 on the console host 14 (without further mentioning the role and function of the web server software 15 on the control management system 3.

In addition, to support non-web based console, the web server software 15 on the control management system 3 is often not required. In this case, the console support software modules 8 could communicate with the management console software 10 with a suitable protocol other than a web protocol such as HTTP.

Figure 5:
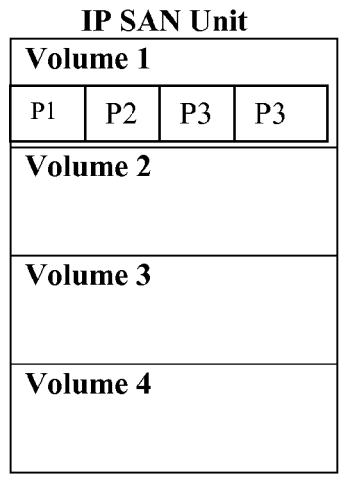
FIG. 5 illustrates an Example of Storage Volume Information of an IP SAN Unit in accordance with one embodiment of the present invention.

The virtual storage service pool 11 includes a plurality of SAN units 4 such as IP SAN and fiber channel SAN units, wherein each SAN unit further includes service modules 6. Each SAN unit 4 further has configured with storage media, storage communications and control media. The storage hardware media of each of the SAN units 4, for example a disk drives, is configured to have one or more logical volumes. Each of the volumes, in one embodiment, is further partitioned into several portions, as shown in FIG. 5. The service software modules 6 of each of the SAN units 4 further contain block data service and other service software modules. The service software modules 6, in one embodiment, is configured to communicate with the distribute control management system 3 for providing storage information and for performing storage operations based on received requests. The service software modules 6, in another embodiment, are further configured to communicate with the service software modules 9 of a host 1 for providing block data services directly to the host 1. The service software modules 6 can be implemented by any suitable programming languages such as C, C++, Java, etc and they may employ any suitable IP based communication protocols for data read and write. Each mentioned software modules comprises programming instructions to be executed by the mentioned computer system step by step for carrying out one or more designated tasks (requests).

In one embodiment, the control management system 3 organizes the SAN units 4 to form the virtual storage service pool 11. The information of the virtual storage pool 11 is kept and maintained via a SAN unit information list by the control management system 3. in one embodiment, every entry on the SAN unit information list comprises the information of a specific storage unit 4 including its name, IP addresses, status, and the storage volumes, each volume's block data addresses and size for each SAN unit 4. The presence of a spare IP SAN unit 13 represents a part of recovery scheme used in the central controlled distributed scalable virtual machine environment.

Fiber channel to IP gateway 5 is a component that is configured to provide translation between Fibre Channel based protocol and IP based protocol so that Fibre Channel based SAN unit 4 will appear as if it is a IP based SAN unit to the control management system 3 and host 1.

Fiber channel SAN unit 4 is similar to an IP SAN unit 4 except it uses Fiber Channel storage control media and uses Fiber Channel protocol to communicate with other parties over a fiber channel network. In addition, any Fiber Channel SAN unit 4 appears as an IP based SAN unit 4 once it connects to a Fiber Channel to the IP gateway 5 in the network infrastructure 2 of the distributed virtual SAN infrastructure. Therefore, to simplify the foregoing discussion, the fiber channel SAN unit 4 will be treated similarly as an IP SAN unit 4 in the virtual storage pool 11 and in all of following discussion without additional comments.

The web based multi-tasking support for management console (web browser) 10 on the console host (14) of the CCDSVM has been described in the pending patent application entitled "Concurrent Web Based Multi-Task Support for Control Management System" with application Ser. No. 12/079,482, filed on Mar. 27, 2008 by the same author of present invention, and herein incorporated in its entirety by reference. The management console 10 could be a commercially available web browser 10 on the market or a proprietary Web browser 10. A web browser 10 is operable to communicate with the web server software 15 of the control management system 3 through a web protocol such as HTTP. The Web browser 10 could be implemented by any suitable programming languages such as C, C++, Java, XML, etc. In addition, the management console software module 10 could be a networked software module instead of web browser software for supporting non-web based management console 10. In this case, any other suitable network protocols can be used instead of using web protocols such as HTTP.

To simplify the foregoing discussion, the communication path between management console 10 of the console host 14 and the console support software modules 8 of the control management system 3 will not further mention the role or function of web server software module 15 in this invention.

From the management console 10, multiple system operations and tasks can be performed by user for the entire distributed virtual SAN infrastructure. There are may be one or more management consoles 10 of said distributed virtual SAN infrastructure anywhere across said network.

Figure 2:
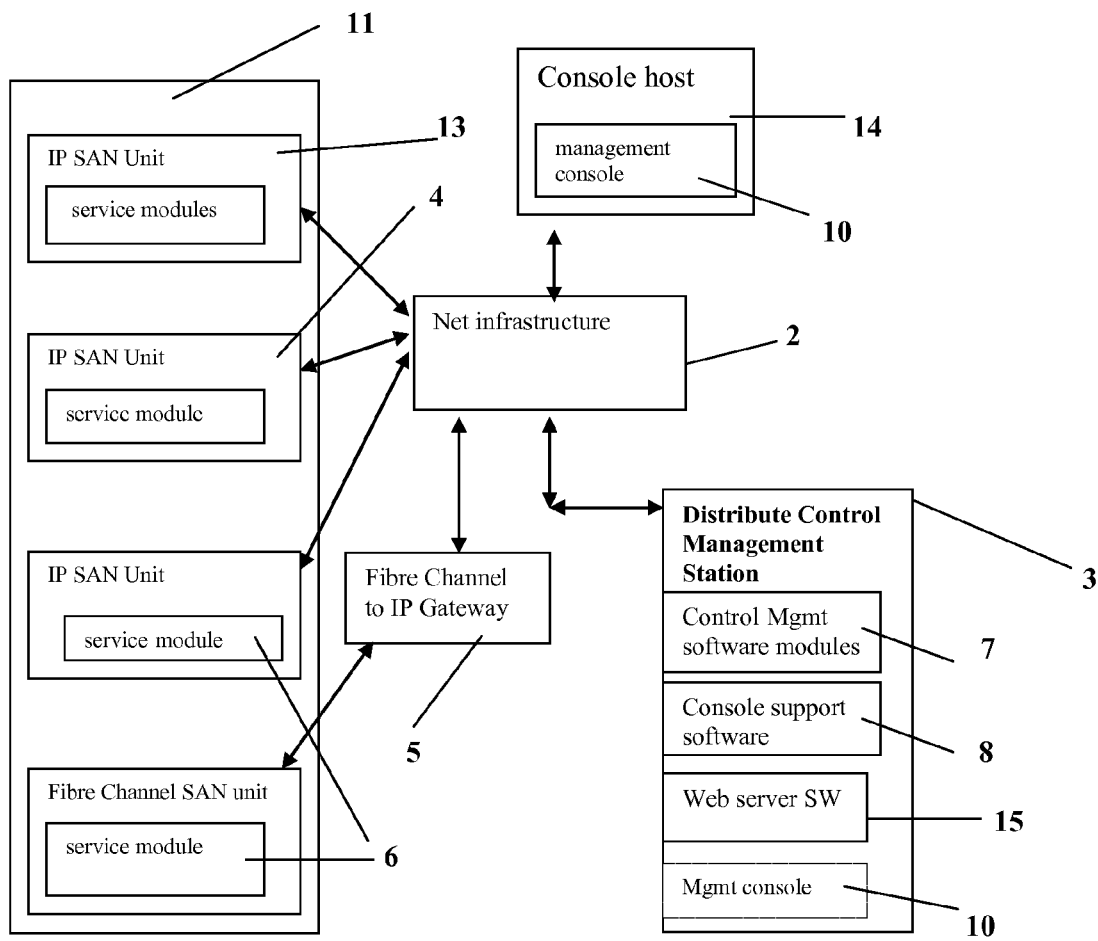
FIG. 2 illustrates actual Components of Distributed Virtual SAN in accordance with one embodiment of the present invention.

FIG. 2 illustrates a portion of FIG. 1 relating to the core part of the virtual SAN. A plurality of SAN units 4 form a virtual Storage service pool 11. The virtual storage service pool 11 may contain information of each of the SAN units' IP address, storage volumes configured on each storage device and their sizes, etc.

Figure 3:
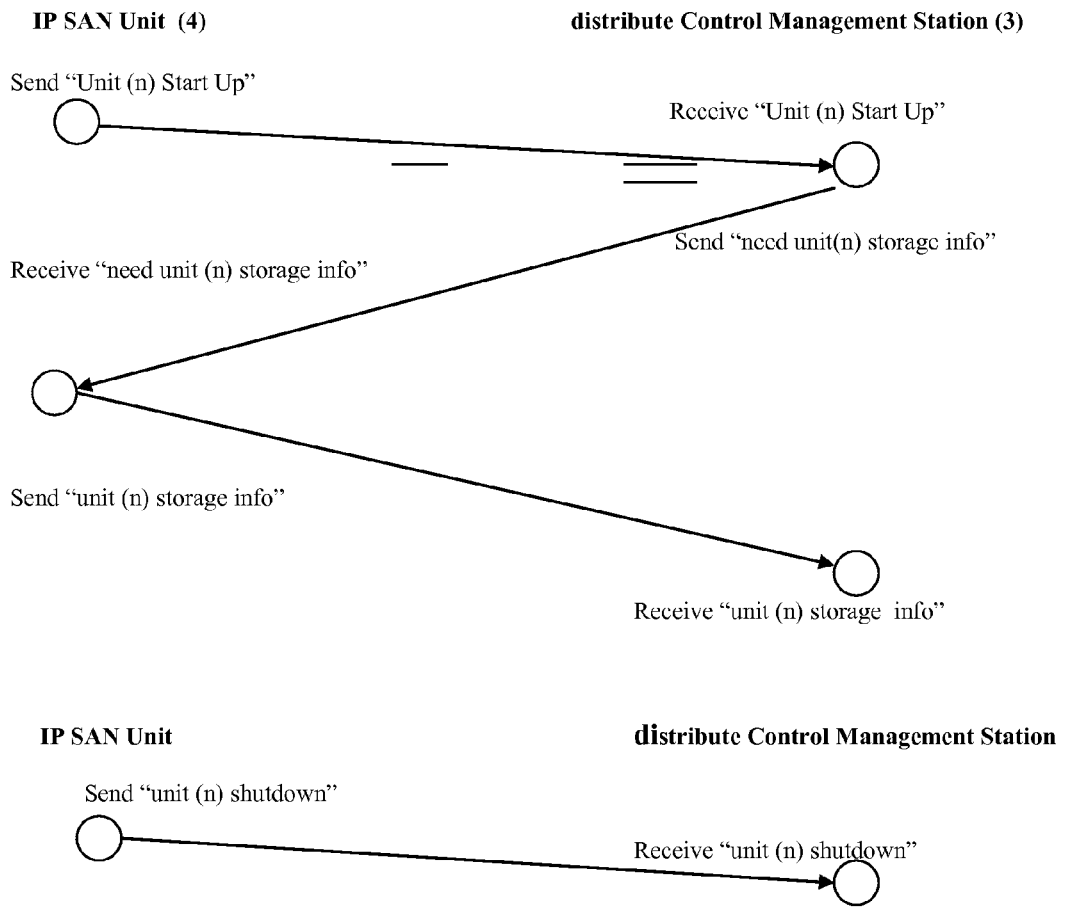
FIG. 3 illustrates Virtual SAN Automatic Configuration Protocol in accordance with one embodiment of the present invention.

FIG. 3 illustrates one embodiment of a protocol for a virtual SAN automatic configuring and building as well as for shutting down a SAN unit 4 in the virtual storage service pool 11. The packet format used with this protocol is described in FIG. 4.

Figure 4:
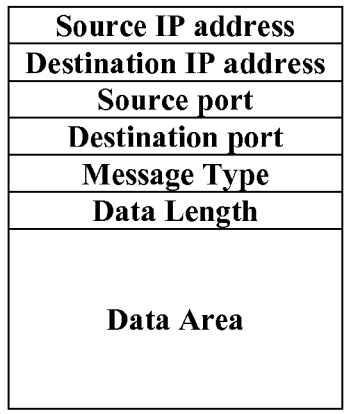
FIG. 4 illustrates a communication packet for a Virtual SAN Auto Configuration Protocol in accordance with one embodiment of the present invention.

FIG. 4 illustrates one embodiment of said format for a storage communication packet, which is used by "Virtual SAN Automatic Configuration Protocol" for sending and receiving messages using the packet, where the source and destination IP address is included that means the storage communication can be independent of naming identification function such as DNS.

FIG. 5 illustrates a storage layout in an IP SAN unit 4, where the storage layout may be further divided into multiple volumes and each volume may be further divided into multiple partitions. Each of the volumes is referred as a logical storage unit in this discussion and it, in one embodiment, might contain multiple pieces of storage spaces from multiple storage hardware media.

Figure 6:
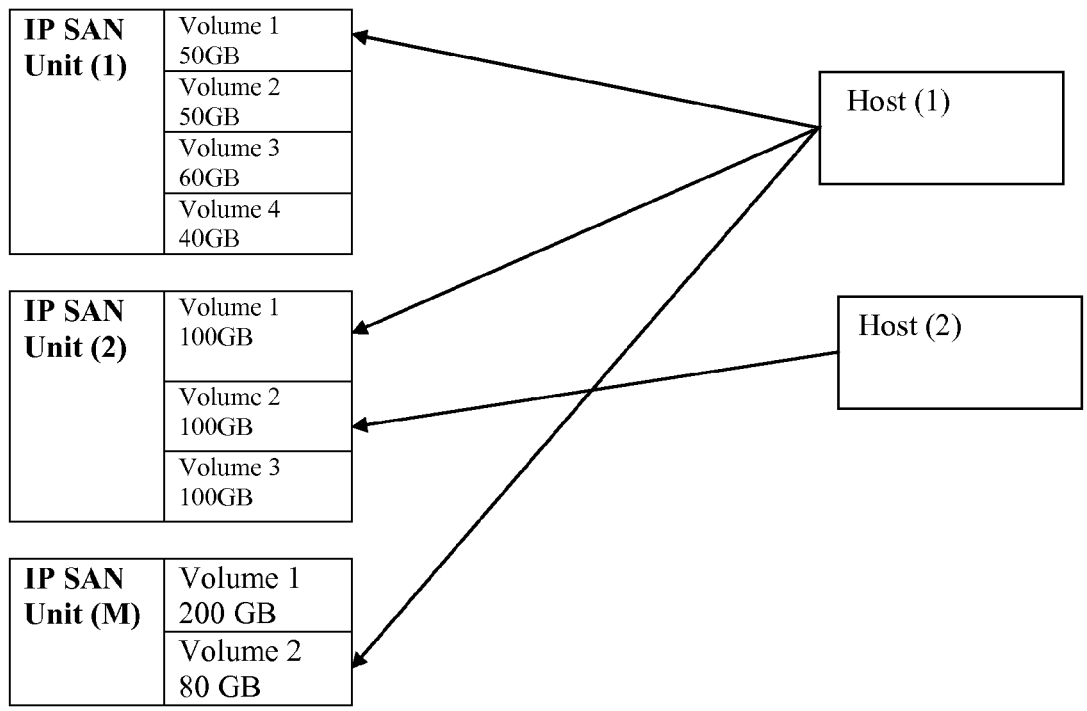
FIG. 6 illustrates a hypothetical example of Storage Volume Requests and Assignment in accordance with one embodiment of the present invention.

FIG. 6 is a simplified and a portion of FIG. 1, which shows a hypothetical example of how hosts 1 are configured access to the storage volumes of SAN units 4. Where each of the SAN units 4 is in the virtual storage pool (11 of FIG. 2) and each host 1 is substantially the same as presented in the FIG. 1.

Figure 8:
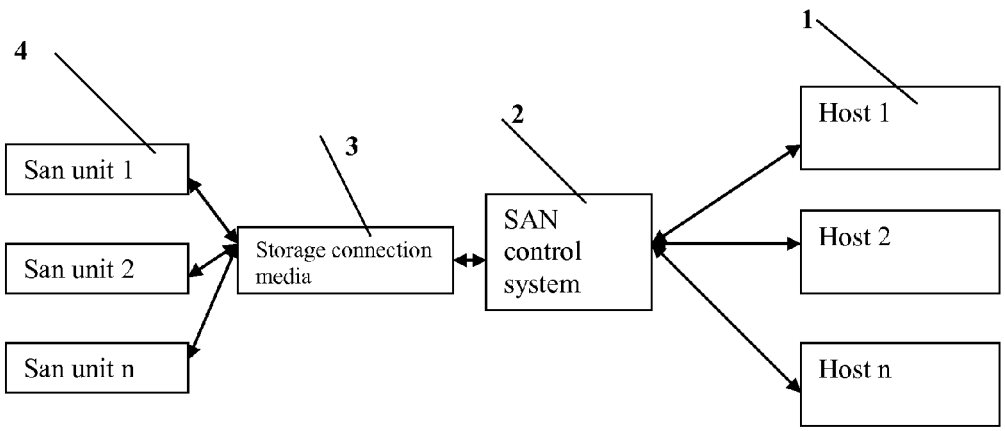
FIG. 8 is an In-Bound Accessed Virtual Storage System.

FIG. 8 is a block diagram illustrating an In-Band Accessed Virtual SAN. FIG. 8 shows another type of virtual SAN, wherein, the actual storage data path from hosts to IP SAN units has to go through control management station.

Figure 9:
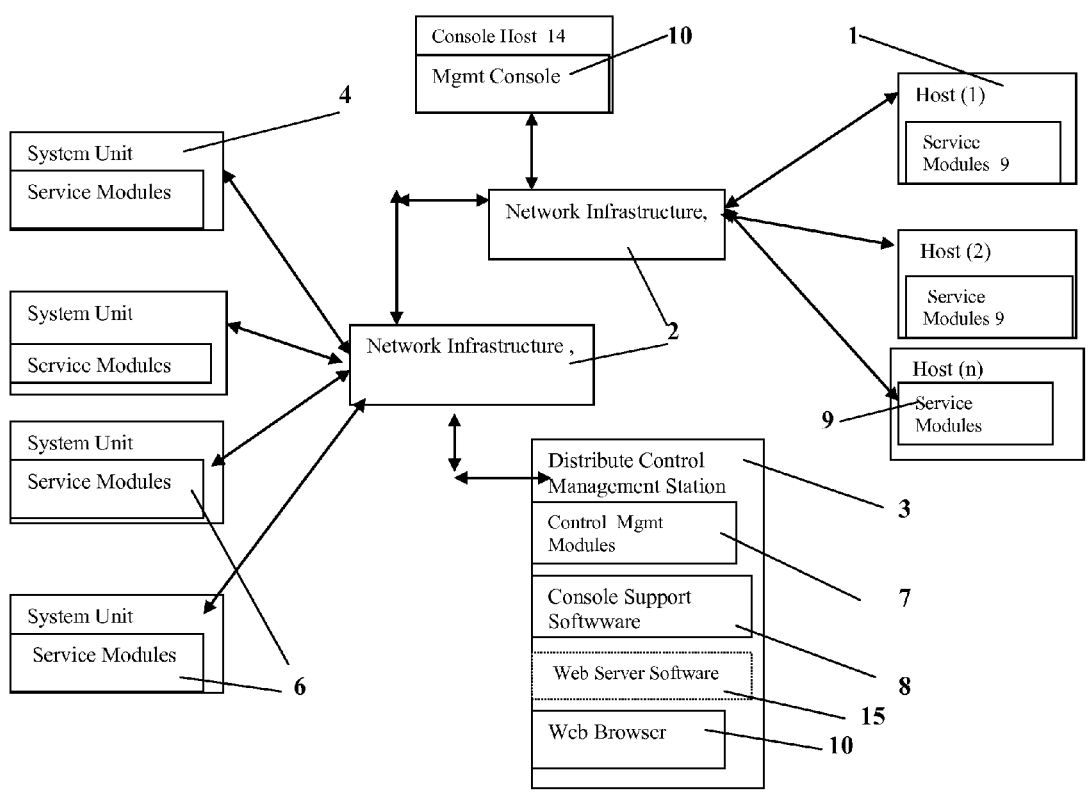
FIG. 9 illustrates a Simplified Diagram of Central Controlled Distributed Scalable Virtual Machine System in accordance with one embodiment of the present invention.

FIG. 9 is a simplified diagram of the central controlled distributed scalable virtual machine. With this invention, the computing systems in a CCDSVM can be flexibly organized into multiple different service pools according to their functionalities. For example, system units 4 such as multiple IP SAN units 4 can form a virtual SAN storage pool. The hosts 1 of the CCDSVM could form other service pools to provide services such as video services, security monitor services, database service, file service, web service and all other services provided across the world wide web or cross type of communication network. In an additional embodiment, multiple NAS ("network attached storage") units 4 can form a virtual NAS storage pool, wherein each NAS can provide at least a local file system residing in the NAS to at least one remote host which deploys the NAS' local file system remotely as if it is the host's local file system via communication to the NAS unit. Also, all service pools of the CCDSVM shall have similar advantages as the virtual SAN storage pool has, such as automatic configuration and provisioning, dynamic capacity scaling and expansion by adding or removing one or more system units dynamically, improved performance, backup and restore, fault handling and disaster recoverability, multi-level security control, centralized manageability, and support on-demand services to the client (host) systems 1.

Figure 10:
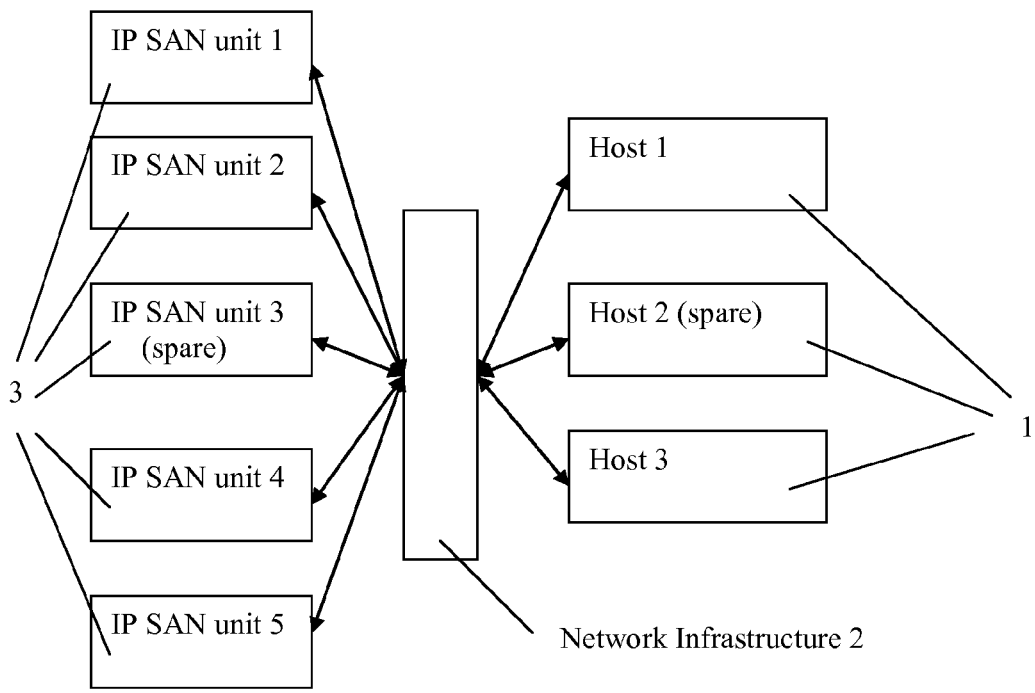
FIG. 10 illustrates a Simplified Diagram of Disaster Recovery Scheme of Distributed Virtual SAN Infrastructure in accordance with one embodiment of the present invention.
Figure 11:
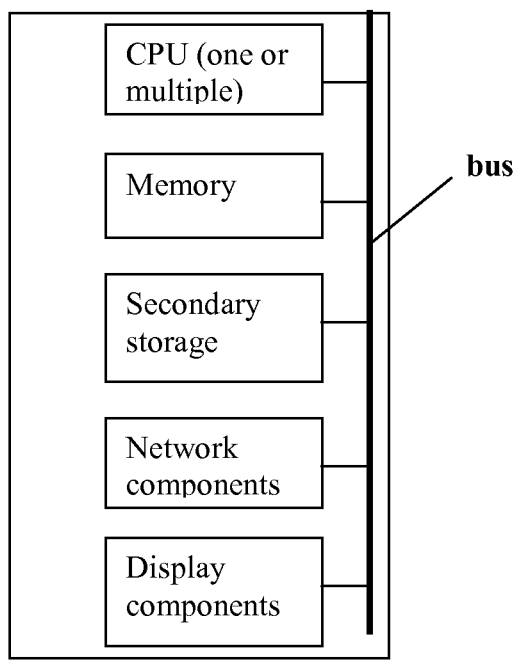
FIG. 11 illustrates the typical hardware components of a typical computer system for said control management system 3, system unit 4 such as storage unit of IP SAN unit 4 and spare IP SAN unit 13, host 1, and console system 14. The computer system comprises one or multiple CPU, memories, secondary storages such as disk or memory sticks, network interface cards and display components such as monitors or others. These components are connected through bus or cable.

FIG. 10 is a embodiment of a disaster recovery scheme of the distributed virtual san infrastructure, which includes one virtual storage pool 11 of a plurality of SAN units 4 and one service pool of multiple hosts 1. For example, host-1 1 can access to IP SAN unit-1 4 and IP SAN unit-2 4 while host-3 1 is configure access to IP SAN unit-4 4 and IP SAN unit-5 4. Also, IP SAN unit-1 and unit-2 are mirrored so that they have kept a same copy of data for the host-1 1. Therefore, whenever one of IP SAN unit-1 and unit-2 failed, the mirrored one can continue providing storage service to the host as commonly practiced in the industry. The same to be true for IP SAN unit-4 and unit-5 with host-3 1. That is the IP SAN unit-4 and unit-5 are mirrored so that they have kept a same copy of data for host-3 1. In addition, a IP SAN unit-3 may be a spare unit to provide fault replacement when a mirroring IP SAN unit having fault and a host-2 could be a spare host for providing fault replacement when any one of the host-1 1 or host-3 1 having fault occur.

FIG. 1 shows a simplified diagram of a distributed virtual SAN infrastructure according to the present invention. With the distributed virtual SAN infrastructure, the distributed virtual SAN storage service pool 11 comprises one or more SAN units 4, which may be further connected to a distribute control management station 3. The SAN units 4 can be accessed by one or more hosts 1 via the network infrastructure 2. The entire distributed virtual SAN infrastructure can be operated through the management console 10 on the console system 14.

The hundreds and thousands terabytes of a virtual storage volume service pool 11 of the distributed virtual SAN infrastructure can be constructed and updated when each of the SAN units 4 is booted up or brought to online. The virtual storage volume service pool 11, in one embodiment, is updated when at least one of SAN units is powered down or removed from the distributed virtual SAN infrastructure. FIG. 3 shows one embodiment of the distributed Virtual SAN Automatic Configuration Protocol, which leads to the success of constructing the virtual storage service pool11 of the distributed virtual SAN infrastructure according to this invention. The following are automatic sequence of steps for building the storage volume service pool 11 of the virtual SAN based on this protocol illustrated in the FIG. 3. The protocol described bellow could utilize IP based protocol such as SNMP, or a much simple UDP protocol as illustrated in FIG. 4, or any other suitable protocols.

In one embodiment, when a IP SAN unit 4 such as unit (n) brought up online, the SAN service modules 6 of the IP SAN unit 4 sends out a "SAN unit (n) startup" packet, indicating either the SAN unit numbered as "n" is power up or a previously downed network link is up again, to the distribute control management system 3. The "SAN unit (n) startup" packet could be a simple user defined UDP packet illustrated in the FIG. 4 with a message type of system up. This message carried by the packet could also be a SNMP trap of cold start packet, or link-up packet or other short packet/message of any suitable IP protocols.

When the distribute control management modules 7 of the distribute control management system 3 receives the IP SAN unit (n)'s packet, it stores the IP SAN unit (n)'s information into a SAN unit information list on the distribution control management system 3.

After storing the information of the IP SAN unit (n) into the SAN unit information list, the control management modules 7 of the distribute control management system 3 sends back a "need SAN unit (n)'s storage info" packet to the IP SAN unit (n) 4.

When the SAN service modules 6 of the IP SAN unit (n) 4 receive the packet of "need SAN unit (n)'s storage info", it obtains the storage information of the IP SAN unit (n) 4 and encoded the obtained information into a packet as illustrated in FIG. 4, which includes the number of storage volumes, each volume's starting address (logical block data address, LBA), length, and the end address (logical block address, LBA). The SAN service modules 6 then send the packet of "unit (n) storage info" back to the control management system 3.

After receiving the "unit (n) storage info" packet from the IP SAN unit (n) 4, the distribute control management modules 7 of the distribute control management system 3 update the stored SAN unit information list for the virtual storage pool 11 with the corresponding storage information of the IP SAN unit (n) based on the received information from the packet.

When any one of IP SAN unit (n) is down or a communication link of a IP SAN unit (n) is down, the service module 6 of the IP SAN unit (n) 4 sends a "Unit (n) shutdown" packet to the distribute control management system 3. This shutdown packet could be an SNMP trap of link down, or a simple UDP packet illustrated in FIG. 4 with a message type of system down, or could be other short packet based on some other protocols.

After receiving the "unit (n) shutdown" packet from the IP SAN unit (n) 4, the distribute control management modules 7 of the distribute control management system 3 update information of the virtual storage pool 11 through updating the SAN unit information list for the specific IP SAN unit (n) 4, where in one embodiment the updated information could be the total size of the capacity of the virtual storage pool, could be the hosts' storage volume allocation (mapping) information, and could be the status down for the SAN unit (n). The method and principles of automatic constructing the virtual storage pool 11 can be applied for various other virtual machines such as for virtual video server, database server, web server, file server, etc. without limits; For one example, the SAN unit described above may be replaced by a video server, and the "storage info" in the packet for the protocol sequence can be replaced with the "video service info" etc. for constructing a different type of service pool such as for a virtual video service pool or a virtual database service pool etc. without limits.

After one or more SAN units 4 are online, and the control management system 3 obtains and stores the information relating to the storage volumes for every SAN unit 4 in the virtual storage pool 11. Therefore, the control management system 3 is able to accept block data request from a plurality of hosts 1 and distribute a requested storage volume via the virtual storage pool 11 to each of the requested hosts 1 in several steps as follow:

First, as illustrated in FIG. 6, in one embodiment, a host-1 1 sends a request to the control management system 3 for requesting a specific sized storage space, such as a 80 GB (gigabyte) of storage space. Second, the control management system 3 receives the request and stores the host-1's information and searches for the availability of 80 GB of storage volume through SAN units 4 in the virtual storage pool 11. The control management system 3, for example, identifies an volume-2 which is 80 GB in size and is available on a SAN unit-M in the virtual storage service pool 11. Third, the control management system 3 sends the information of the host-1 to the SAN unit-M, where the information includes the IP address of the host-1, the requested storage size and the identified storage volume 2. The control management system 3 also sends the identified storage volume information relating to the SAN unit-M to the host-1 1, where the storage volume information includes the IP address of IP SAN unit-M, the volume number and the size, the volume's starting address, and volume's ending logical address block (LBA). Therefore, all parties of three, namely the control management system 3, the host-1 and the SAN unit-M keep and synchronize a same mapping for the storage volume-2 of SAN unit-M's assignment. Fourth, once the host-1 1 and the SAN unit-M get each other's information, the host-1 1 can directly and independently access to the volume-2 of the SAN unit-M immediately and the SAN unit-M, in one embodiment, is further configured to perform security checking in light of storage access based on the received mapping information.

Alternatively in another embodiment, the above described steps may also be semi-automatically setup with assisting of system operations performed from the management console 10 on a console system 14. For example, an administrator could initially setup volume-2 of the SAN unit-M to be exclusively accessible by the host-1 1 as long as the administrator acknowledges that host-1 needs such size of storage volume. The administrator can also setup the host-1 with all information needed for access to the volume-2 of the SAN unit-M. Finally, the host-1 1 can access to the volume-2 of SAN unit-M directly without going through the control management system 3.

The present invention also discloses a mechanism of dynamically scaling of storage capacity. After the distributed virtual SAN storage pool 11 is built, the hosts 1 is operable access to the storage volumes of the SAN units 4, in the virtual storage service pool 11 directly without further involvement of the control management system 3. Therefore, the control management system 3 can continue to handle dynamically adding one or more storage units 4 into the virtual storage pool 11 of the distributed virtual SAN based on demand without interrupting each of the hosts 1 normal access to the storage volumes in the assigned SAN units 4. As a result, this guarantees that the distributed virtual SAN storage pool 11 can be dynamically expanded without interrupting the normal operations and access of the entire distributed virtual SAN storage infrastructure 11.

The present invention further discloses a technique of providing scalable storage for each host 1. As illustrated in FIG. 6, once the distributed virtual SAN storage pool 11 is constructed, in one embodiment each host 1 can access to one or more SAN units 4 in the storage service pool 11 of the distributed virtual SAN infrastructure. For example, a host-1 1 can access to SAN unit-1, unit-2, and unit-M after the host-1 1 made requests for access to storage volumes of the IP SAN units 4 in the storage service pool 11 and the control management system 3 subsequently granted each of the requests. This effectively provides scalable storage system for each host 1 within the distributed virtual SAN infrastructure of this invention. Further, the distributed virtual SAN infrastructure provides far better scalability than the in-band accessed virtual SAN illustrated in FIG. 8, wherein the scalability of in-band accessed virtual SAN were severely limited by a bottlenecked control management system.

The present invention also discloses a method of storage sharing mechanism. Once the distributed virtual SAN storage service pool 11 is built, in one embodiment, each SAN unit 4 in the storage service pool 11 of distributed virtual SAN infrastructure may be configured with multiple storage volumes in form of block data, which can be accessed by one or more hosts 1. Therefore, this allows multiple hosts 1 to share an IP SAN unit 4 by granting and assigning each host to exclusively access to one or more storage volumes on that IP SAN unit 4. The FIG. 6 demonstrates such an example of the storage sharing, wherein IP SAN unit-2 4 has three volumes, which named volume-1, volume-2, and volume-3. The block data service modules 6 of the IP SAN unit-2 allows volume-1 to be accessed exclusively by host-1 1 while volume-2 to be accessed exclusively by host-2 1.

Figure 7:
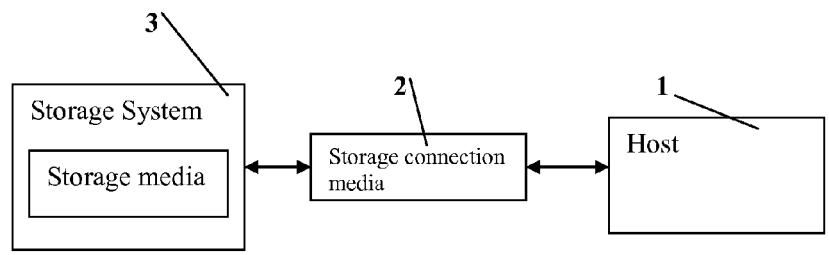
FIG. 7 is a conventional Direct Attached Storage System.

With in-band accessed virtual SAN illustrated in FIG. 8, the control management system could be a performance bottleneck. With distributed virtual SAN of this invention, each host 1 can directly and independently access to any IP SAN unit 4 in the storage service pool. Therefore, the performance of storage access for each host 1 will not be suffered from the bottleneck and can match the performance of direct attached storage system illustrated in FIG. 7 when a high speed network connection is deployed in the distributed virtual SAN infrastructure.

The present invention also illustrates a method of a centralized management of the distributed virtual SAN. The management console 10 being executed in the console host 14 and/or in the distribution control management system 3 is configured to display, via a web UI (user interface), information about all IP SAN units 4 and hosts 1 receive from the control management modules 7 via communication with the console support software module 8 of the control management system 3. Therefore, through the displayed information on the management console 10, users can perform centralized management tasks for the entire IP SAN units 4 of distributed virtual SAN storage pool 11, the hosts 1, and the control management system 3, in one embodiment the tasks are performed via web operation menu.

With multiple concurrent tasks support that controlled by the console support software module 8 of the control management system 3, the users at the management console 10 can perform full range of system operations and tasks, where the management console 10 could be a web browser or a non-web based networked console. The mentioned tasks include, for example, creating a file system on a storage volume such as a 60 Giga bytes sized file system, configuring a RAID controller, or transfer one or more files between systems of the CCDSVM including multi-Giga Bytes of file.

These management tasks also include storage configuration, storage volume allocation (assignment) or de-allocation for hosts, storage partitioning and repartitioning, storage, network, and resource usage and activity monitoring, security management, data replication and backup/restore management, fault management and all others. The security management includes setup secure access policies at multiple levels of the virtual SAN infrastructure, such as at control management system level, at SAN unit level and at host level. The security also can be enforced for users performing administration tasks. For example, authenticating and validating a specific user from a specific system's web browser to access the virtual SAN infrastructure, authenticating a user performing specific task for one or more specific systems such as for SAN unit, host or control management system. For other example, assigning and authenticating a host access to one or more specific SAN units' specific storage volumes, and assigning storage volumes of a SAN unit to be accessed by specific one or more hosts.

In one embodiment, the present invention discloses a method for disaster recovery. The use of DNS or IP address identification mechanism disclosed in present invention provides the distributed virtual SAN infrastructure with capability of overcoming the geometric (region) limitation such as being deployed in a cross network domain environment or in a single network domain environment. Therefore, the SAN units 4, hosts 1 and the control management station 3 could be flexibly clustered on a corporate storage network, a corporate Intranet, LAN, WAN or the Internet. As a result, a disaster recovery plan can have a topology of the distributed virtual SAN infrastructure span beyond 100 miles range across Internet or Intranet as oppose to the traditional 10-kilometer limitation in a fiber channel environment.

In addition, the disaster recovery plan of the distributed virtual SAN infrastructure can be flexibly implemented as illustrated in FIG. 10. With this recovery plan, in one embodiment, the host-1 or host-3 1 can continue to operate even if one of its mirrored IP SAN units such as IP SAN unit-1, unit-2, unit-4 or unit-5 4 has failed because a spare IP SAN unit-3 4 can be used to quickly replace one of failed mirrored IP SAN units 4, for example, when one of IP SAN-1 or IP SAN-2 is failed. On the other hand, the hosts may be organized into a service pool for providing special services, such as distributing video services, distributed database pool, distributed security monitor services, web services and all other services provided across the network or the world wide Web. Therefore, whenever one of the host-1 or host-3 failed, a spare host-2 can quickly take over the assigned IP SAN storage unit to replace the failed host1 or host-3 to continue providing the services.

Due to the ability control web based multi-tasking and the ability of controlling security and controlling user performing various tasks, the software modules of the CCDSVM has created a web based virtual computer user work environment (WCUWE) for a virtual operating system of the CCDSVM. The WCUWE created by the mentioned software modules (control part of the WCUWE) on the control management station 3 which includes console support software modules (web server interface) 8, control management modules 7 and web server software modules 15 on the control management system 3, and together by the service modules 8 (agent part of the WECUWE) on each system unit 4. Like the computer user work environment (CUWE) running on top of a native operating system kernel, each part of the WCUWE also running on the top of a native operating system kernel.

Figure 12:
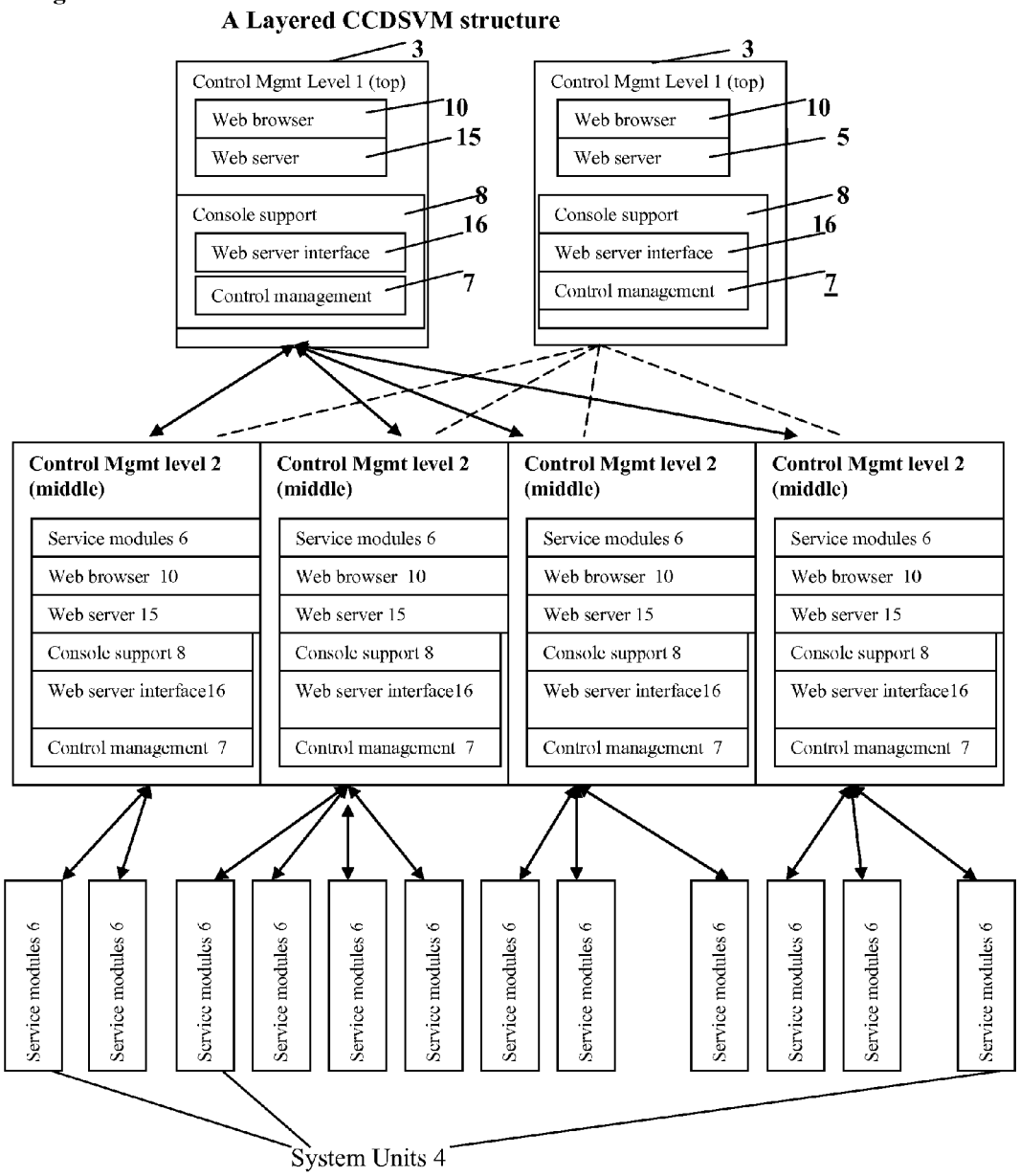
FIG. 12 illustrated an embodiment of a multi-layered central controlled distributed scalable virtual server, where a top level control system controls one or more middle level (level-2) control systems and each middle level control system can control s plurality of system units such as IP SAN units and spare IP SAN units. Therefore, the level 2 control system must have related software modules for both the control system and system unit such that the middle level control system has double roles including a role as a system unit to the top level control system for executing a request received therefrom and sending response thereto, and a role as the control system to control the system units bellow its level.

In another embodiment, one or more service pools of the CCDSVM can be organized into multi-layered structure as illustrated in FIG. 12, where a top level control system controls one or more middle level (level-2) control systems and each middle level control system can control a plurality of system units. Therefore, the level 2 control system must have related software modules for both the control system and system unit 3 such that the middle level control system has double roles including a role as a system unit to the top level control system for executing a request received therefrom and sending response thereto, and a role as the control system to control the system units bellow its level.

The invention claimed is:
1. A server comprising:
   at least one storage network connection medium, and one
      non-transitory computer-readable medium comprising program instructions that being executed by the server, cause the server to control automatically forming a storage pool through control execution of a storage pool construction protocol between the server and a plurality of storage servers across a communication network, wherein the program instructions causing the server to control execution of the storage pool construction protocol comprise:

program instructions for receiving a packet from a first one of the storage servers upon the first one of the storage servers being brought online, the packet informing the server that the first one of the storage servers is going online;

program instructions for storing, according to the packet received, identification information of the first one of the storage servers for organizing the storage pool;

program instructions for sending an enquiry packet back to the first one of the storage servers for requesting storage information of the first one of the storage servers;

program instructions for receiving a response packet from the first one of the storage servers, the response packet comprising the storage information including information of at least one storage volume configured in the first one of the storage servers; and program instructions for updating the stored information of the first one of the storage servers for the storage pool by including the storage information of the first one of the storage servers obtained from the response packet.

2. The server of claim 1, wherein the server further controls the execution of the storage pool construction protocol between the server and a second one of the storage servers for the second one of the storage servers joining the storage pool in the same way as for the first one of the storage servers joining the storage pool.

3. The server of claim 1, wherein the program instructions for the server updating the stored information further comprise: automatically updating status for the storage pool in response to the first one of the storage servers being shutdown, disconnected, or reconnected, or a new storage server being added therein.

4. The server of claim 3, wherein said updating status includes:

updating total size of storage capacity for the storage pool in response to the changing status of the first one of the storage servers.

5. The server of claim 1, wherein the identification information comprises name and network address of the first one of the storage servers, the storage information comprises information of at least one storage device, and the information of the at least one storage volume comprises starting address and size of the at least one storage volume.

6. The server of claim 5, wherein the at least one storage volume is a logic storage unit configured by using the at least one storage device.

7. The server of claim 1, wherein the storage servers in the storage pool are interconnected and spanned across said communication network of a corporate storage network backbone, a corporate Intranet, the Internet, a local area network ("LAN"), or a wide area network ("WAN"), and comprises wired and wireless communication links.

8. The server of claim 1, wherein the program instructions causing the server to control automatically forming a storage pool include program instruction for the server further to cause displaying the storage pool on an operation console, comprising display of the storage information obtained from each of the storage servers, wherein the storage pool is represented by a storage information list.

9. A server comprising:

at least one storage network connection medium, and one non-transitory computer readable medium comprising program instructions that, being executed by the server, causes the server to control distributing storage volume through a storage pool for delivering storage service;

wherein the program instructions include:

program instructions for collecting identification and storage information automatically from each of a plurality of storage servers to form the storage pool across a network through executing a storage pool construction protocol;

program instructions for receiving a first request from a first computing device for requesting a storage volume with capacity for delivering said storage service;

program instructions for identifying, via the storage pool, a first storage volume in a first one of the storage servers available for delivering the storage service according to the first request, and program instructions for synchronizing a mapping with the first computing device and the first one of the storage servers, the mapping including information of the first computing device, the first one of the storage servers and the first storage volume, including information of internet protocol ("IP") address, size, and starting logical address of the first storage volume; and program instructions for permitting the first computing device according to the mapping directly access to the storage service delivered through the first storage volume in the first one of the storage servers independent of the server.

10. The server of claim 9, wherein the server further receives a second request from a second computing device for requesting storage service through a storage volume, and identifies a second storage volume in a second one of the storage serves available for the second request upon the first one of the storage servers not having a storage volume available for the second request while the second one of the storage servers has.

11. The server of claim 9, wherein the server further receives a second request from a second computing device for requesting storage service through a storage volume, and identifies a second storage volume in the first one of the storage serves available for the second request upon the first one of the storage servers having a storage volume available for the second request.

12. The server of claim 9, further comprising: the first computing device automatically sending the first request to the server in response to the first computing device requires more storage capacity.

13. The server of claim 9, further comprising: the first request being sent to the server via an admin effort in response to the first computing device requires more storage capacity.

14. A server comprising:

at least one storage network connection medium, and one non-transitory computer-readable medium comprising program instructions that being executed by the server, cause the server to control operations for a plurality of storage servers through a storage pool; wherein the program instructions for the server control operations comprises:

program instructions for controlling execution of a storage pool construction protocol between the server and each of the storage servers to automatically form the storage pool across a network; and program instructions for causing display of the storage pool on a console device and program instructions for facilitating a user through the storage pool displayed to remotely perform operations to the storage servers.

15. The server as recited in claim 14, wherein said storage servers further are storage area network ("SAN") storage servers, each of the SAN storage server is an internet protocol ("IP") SAN storage server or a fiber channel storage server.

16. The server as recited in claim 14, wherein said storage servers further are network attached storage ("NAS") storage servers.

17. The server as recited in claim 14, wherein said operation comprises:

replicating data, configuring and partitioning storage device, or backing up or restoring data for a selected one of the storage servers.

18. The server as recited in claim 14, wherein said displaying of the storage pool comprises:

displaying information of the storage servers, including displaying a plurality of storage volumes configured in each of the storage servers, wherein the storage pool is represented by a storage information list.

19. The server as recited in claim 9, wherein the storage pool is represented by a storage information list, the storage information list including the identification and storage information of each of the storage servers in the storage pool.

20. The server as recited in claim 9, wherein the first storage volume is a logical storage unit comprising information of starting address and size of the first storage volume and configured by using at least one storage device.

* * * * *

UNITED STATES PATENT AND TRADEMARK OFFICE
CERTIFICATE OF CORRECTION

PATENT NO. : 9,288,266 B1  
APPLICATION NO. : 14/511129  
DATED : March 15, 2016  
INVENTOR(S) : Sheng Tai Ted Tsao It is certified that error appears in the above-identified patent and that said Letters Patent is hereby corrected as shown below:

Title page Insert

-- (60) Related US Application Data continuation of application No. 13/918,445, filed on 06/12/2013, which is a continuation of application No. 12/944,958, filed on 11/12/2011 and now Pat. No. 8473596, which is a continuation of application No. 12/013,813, filed on 01/14/2008, now Pat. No. 8639788, which is a continuation of application No. 10/713,905, filed on 8/12/2002, now Pat. No. 7379990.

said application No. 12/944,958 is a continuation-in-part of application No. 12/079,482, filed on 3/27/2008, now Pat. No. 8566463, which is continuation of application No. 10/713,904, file on 8/6/2002, now Pat. No. 7418702. --.

Signed and Sealed this  
Seventeenth Day of May, 2016

Michelle K. Lee  
*Director of the United States Patent and Trademark Office*